(12) United States Patent
Bouvet

(10) Patent No.: US 8,886,823 B2
(45) Date of Patent: *Nov. 11, 2014

(54) METHOD OF COMMUNICATING BETWEEN SEVERAL TERMINALS

(75) Inventor: Bertrand Bouvet, Paris (FR)

(73) Assignee: Orange, Paris (FR)

( * ) Notice: Subject to any disclaimer, the term of this patent is extended or adjusted under 35 U.S.C. 154(b) by 1105 days.

This patent is subject to a terminal disclaimer.

(21) Appl. No.: 12/311,110

(22) PCT Filed: Sep. 18, 2007

(86) PCT No.: PCT/FR2007/051964
§ 371 (c)(1),
(2), (4) Date: Mar. 19, 2009

(87) PCT Pub. No.: WO2008/035009
PCT Pub. Date: Mar. 27, 2008

(65) Prior Publication Data
US 2009/0265477 A1    Oct. 22, 2009

(30) Foreign Application Priority Data
Sep. 20, 2006   (FR) ..................... 06 53843

(51) Int. Cl.
*G06F 15/16*    (2006.01)
*H04L 29/06*    (2006.01)

(52) U.S. Cl.
CPC .......... *H04L 65/104* (2013.01); *H04L 65/1069* (2013.01); *H04L 65/103* (2013.01)
USPC ......................................... 709/231; 709/219

(58) Field of Classification Search
CPC . H04L 65/103; H04L 65/104; H04L 65/1069; H04M 2203/2066; H04M 7/127; H04Q 2213/13034; H04Q 2213/13389; H04Q 3/0045; H04S 1/00
USPC ......................................... 709/219, 230, 231
See application file for complete search history.

(56) References Cited

U.S. PATENT DOCUMENTS 6,359,883 B1 *  3/2002  Lechleider .................... 370/389
7,072,726 B2 *  7/2006  Wilson et al. .................. 700/94

(Continued)

FOREIGN PATENT DOCUMENTS

EP              1 594 287          11/2005

*Primary Examiner* — Phuoc Nguyen
*Assistant Examiner* — Davoud Zand
(74) *Attorney, Agent, or Firm* — Knobbe Martens Olsen & Bear LLP

(57) ABSTRACT

The invention relates to a method of communicating between at least two devices, comprising in particular the following steps: a step of hooking up a first device and at least one second device, and a step of transferring a first multimedia stream from the first device to the second device, characterized in that it also comprises the following steps: a step of determining, in the course of which it is noted that the first device or a first communication network to which the first device is connected or a second network to which the second device is connected is adapted for the production or transfer of a multimedia stream comprising N channels, and that the second device comprises means for processing a multimedia stream comprising P channels, and a step of trunking a second multimedia stream to the second device, carried out in parallel with the step of transferring the first multimedia stream. The invention also relates to an associated communication system. Application to telephony or videophony over IP.

10 Claims, 2 Drawing Sheets

(56) References Cited

U.S. PATENT DOCUMENTS

Figure 1:
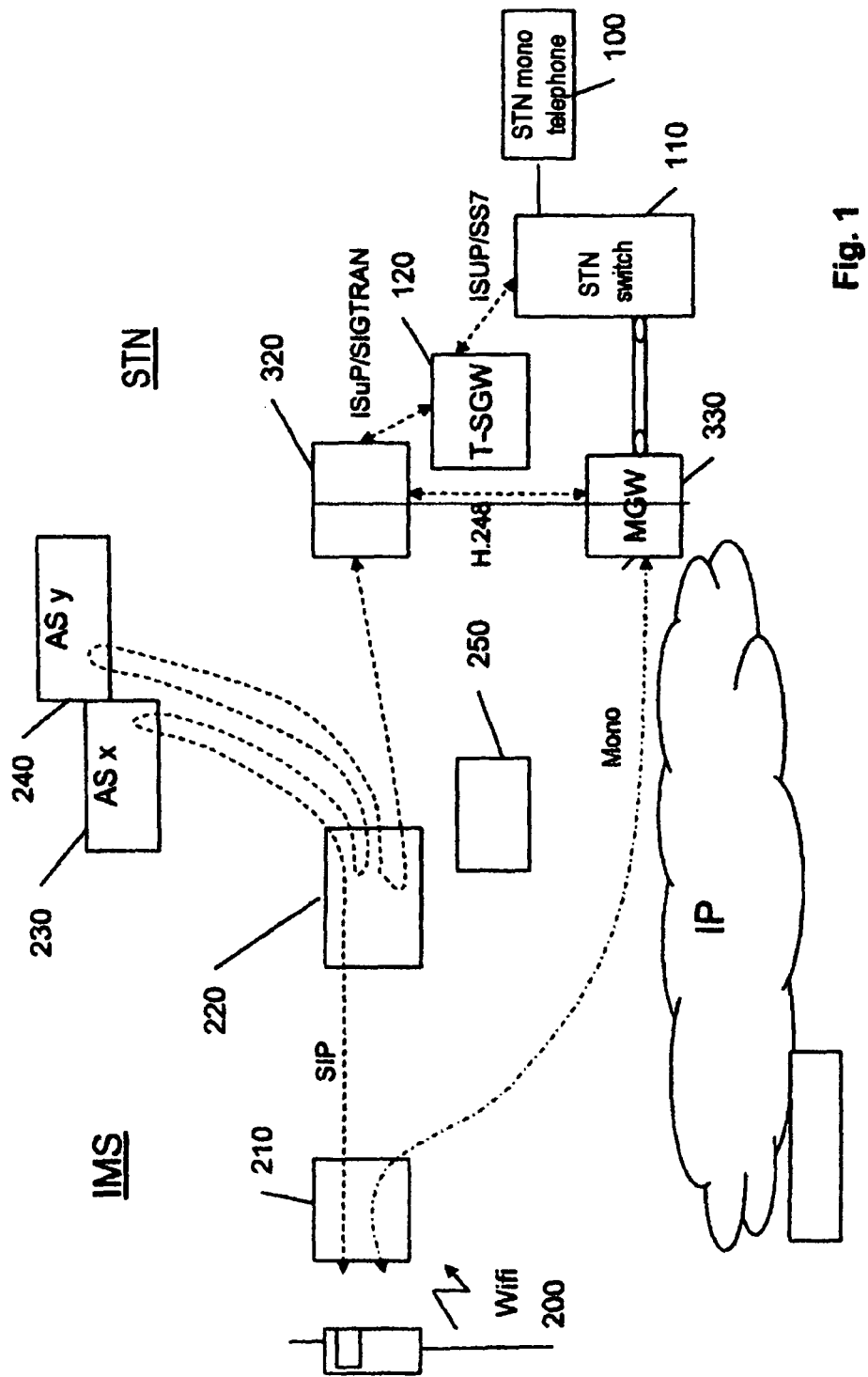

| | | | |
|---|---|---|---|
| 7,327,712 B2* | 2/2008 | Fukui | 370/340 |
| 7,447,198 B1* | 11/2008 | Banks et al. | 370/386 |
| 7,505,825 B2* | 3/2009 | Wilson et al. | 700/94 |
| 7,548,548 B2* | 6/2009 | Rakib et al. | 370/419 |
| 7,602,723 B2* | 10/2009 | Mandato et al. | 370/236 |
| 7,606,627 B2* | 10/2009 | Wilson et al. | 700/94 |
| 7,688,899 B2* | 3/2010 | Ketchum et al. | 375/260 |
| 7,693,226 B1* | 4/2010 | Lo | 375/260 |
| 7,706,415 B2* | 4/2010 | Varma et al. | 370/535 |
| 2002/0023166 A1* | 2/2002 | Bar-Noy et al. | 709/231 |
| 2003/0035478 A1* | 2/2003 | Taubman | 375/240.11 |
| 2003/0048856 A1* | 3/2003 | Ketchum et al. | 375/260 |
| 2003/0070081 A1* | 4/2003 | Wee et al. | 713/189 |
| 2004/0078812 A1* | 4/2004 | Calvert | 725/46 |
| 2004/0151206 A1* | 8/2004 | Scholte | 370/473 |
| 2005/0071109 A1* | 3/2005 | DeFelice et al. | 702/120 |
| 2005/0157660 A1* | 7/2005 | Mandato et al. | 370/254 |
| 2005/0259807 A1* | 11/2005 | Madoch et al. | 379/220.01 |
| 2006/0023706 A1* | 2/2006 | Varma et al. | 370/389 |
| 2006/0122717 A1* | 6/2006 | Wilson et al. | 700/94 |
| 2007/0217454 A1* | 9/2007 | Horner | 370/522 |
| 2008/0043659 A1* | 2/2008 | Richards et al. | 370/313 |
| 2008/0060034 A1* | 3/2008 | Egnal et al. | 725/105 |
| 2008/0250456 A1* | 10/2008 | Gervais et al. | 725/54 |
| 2009/0265477 A1* | 10/2009 | Bouvet | 709/231 |
| 2009/0299735 A1* | 12/2009 | Bouvet et al. | 704/201 |
| 2010/0246704 A1* | 9/2010 | Ketchum et al. | 375/267 |

* cited by examiner

METHOD OF COMMUNICATING BETWEEN SEVERAL TERMINALS

This application claims the benefit of PCT/FR2007/051964 filed on Sep. 18, 2007, and French Application No. 06/53,843 filed on Sep. 20, 2006, the contents of which are hereby incorporated herein by reference for all purposes in their entirety.

The invention relates to the field of telecommunications, and more particularly to a method of communicating between at least two devices, including terminals, voice servers of the messaging, audiotel, portal type, etc., connected to one and the same communication network or to different communication networks.

The invention finds an application in the field of telephony, videophones, exchanging of text or data, in point-to-point mode between two devices or in conference mode between more than two devices, for any communication in particular, but not exclusively, in the following situations:
  at least one of the devices has multimedia stream emission capabilities that are inferior to the multimedia stream processing capabilities of at least one other of the devices, or
  a network to which one of the devices is connected has multimedia stream transfer capabilities that are inferior to the multimedia stream processing capabilities of another of the devices.

More generally, the invention is aimed at satisfying multimedia stream processing capabilities of a multimedia device when another remote device engaged in the communication does not have the same capabilities or when a network to which one of the devices is connected does not have appropriate multimedia transfer capabilities.

Here and throughout what follows, the term 'multimedia stream' is understood to mean a stream of digital data relating to information carriers of any type, whatever the nature of this information: audible, visual (text, image, video, etc.), tactile, olfactory, gustatory information, etc. A multimedia stream can comprise several channels, each comprising data relating to an information carrier (sound, image, video, etc.), several channels possibly being associated with one and the same information carrier.

Here the term 'multimedia processing capabilities' (or 'properties') is understood to mean a device's capabilities of utilizing (displaying, modifying, responding to, etc.) a multimedia stream comprising one or more channels. Here the term multimedia emission capabilities (or properties) is understood to mean a device's capabilities of producing and transmitting on an appropriate network a multimedia stream comprising one or more channels. Here the term multimedia transfer capabilities (or properties) is understood to mean a device's or a network's capabilities of transmitting a multimedia stream comprising one or more channels. Finally, a first device or a first network has multimedia capabilities inferior to the capabilities of a second device or of a second network if the first device or the first network can emit, transmit and/or utilize a multimedia stream comprising a lower number of channels than the number of channels of a multimedia stream liable to be emitted, transmitted and/or utilized by the second device or the second network.

The telephone service is furthermore very greatly reliant on (fixed or mobile) circuit switching networks, and a fair number of telephone devices (terminals, voice servers, etc.) have capabilities limited to monophonic audio capabilities, that is to say capabilities limited to the production, reception and utilization of a multimedia stream comprising a single channel comprising data relating to a monophonic audio signal.

The communication devices appearing on the market have ever more multimedia capabilities (these will be referred to, loosely speaking, as multimedia devices), that is to say capabilities of receiving, utilizing and producing streams containing at one and the same time audio, video, textual data, etc. Such is for example the case for terminals of PC type furnished with Voice over IP software, or multimode telephone terminals (GMS+WIFI for example) comprising telephone over IP capabilities and stereophonic audio capabilities.

Nevertheless, during a communication between devices, the properties of the communication are limited to the properties of the device engaged in the communication and having the least multimedia capabilities. For example, during a communication between a telephone terminal connected to a switched network and a multimedia terminal connected to a Voice over IP network or a switched network, the properties of the communication will necessarily be monophonic since they are limited by the link having the least multimedia capabilities, namely the switched network.

The invention offers a technical solution which does not exhibit these drawbacks.

For this purpose the invention proposes a method of communicating between at least two devices, comprising in particular the following steps:
  a step of hooking up a first device and at least one second device, and
  a step of transferring a first multimedia stream from the first device to the second device,
  characterized in that it also comprises the following steps:
  a determination step, in the course of which it is noted that the first device or a first communication network to which the first device is connected or a second network to which the second device is connected is suitable for the production or the transfer of a multimedia stream comprising N channels, and that the second device comprises means for processing a multimedia stream comprising P channels, and
  a step of trunking a second multimedia stream to the second device, carried out in parallel with the step of transferring the first multimedia stream.

The invention thus allows the user of a device furnished with means for processing audio streams comprising P channels to profit from the properties of his device, including when his opposite party has a device or a network endowed with different, or indeed inferior, multimedia properties. As indicated above, a multimedia stream can comprise data relating simultaneously to a sound signal, a text, a video, an image, etc.

In a particular mode of implementation of the invention, the trunking step is carried out only if N is less than P, that is to say if the first device and/or the first network and/or the second network has(have) multimedia emission or transmission capabilities that are inferior to the multimedia processing capabilities of the second device. The carrying out of a trunking step is thus avoided when its effect, an increase in the number of channels of the multimedia stream received by the second device, does not present any benefit for the second device.

The first multimedia stream will be able to comprise N channels, and the second multimedia stream will be able to comprise up to P−N channels. The emission and transmission capabilities of the first device, of the first network or of the second network and the processing capabilities of the second device are thus best utilized.

The determination step may be carried out at the request of a user of the first device. This allows for example the user of the first device, knowing the limited capabilities of the first device, to request that a second multimedia stream, containing for example a video such as an advertisement, be dispatched to his opposite parties or to some of them.

The determination step may also be carried out at the request of a user of the second device. This allows for example the user of the second device to request the trunking of a second multimedia stream (corresponding to a piece of music for example) when a first stream that he receives has a number of channels lower than the capabilities of the second device.

The determination step will advantageously be able to be carried out during the hookup step. Information usually exchanged between the devices in the course of the hookup step will thus be able to be used simultaneously in the course of the determination step.

More generally, the determination step may be carried out at any moment during a communication, optionally after a step of transferring a multimedia stream. This allows for example a user of the second device who is aware that a first multimedia stream that the second device receives has a number of channels lower than the multimedia processing capabilities of the second device.

The invention also relates to a communication system appropriate for the implementation of the method and comprising:
  a system for hooking up a first device and at least one second device
  a system for transferring a first multimedia stream between the first device and the second device
  means for determining properties of the first device and of the second device for producing, transferring, receiving or processing a multimedia stream, and
  means for trunking a second multimedia stream to the second device.

The hookup system and the transfer means comprise elements of a first network to which the first device is connected and/or elements of a second network to which the second device is connected and/or elements for interconnecting the first network and the second network.

The invention will be better understood and other characteristics and advantages will become apparent on reading the description which follows, of examples of implementing a connection method and a connection system according to the invention.

Figure 2:
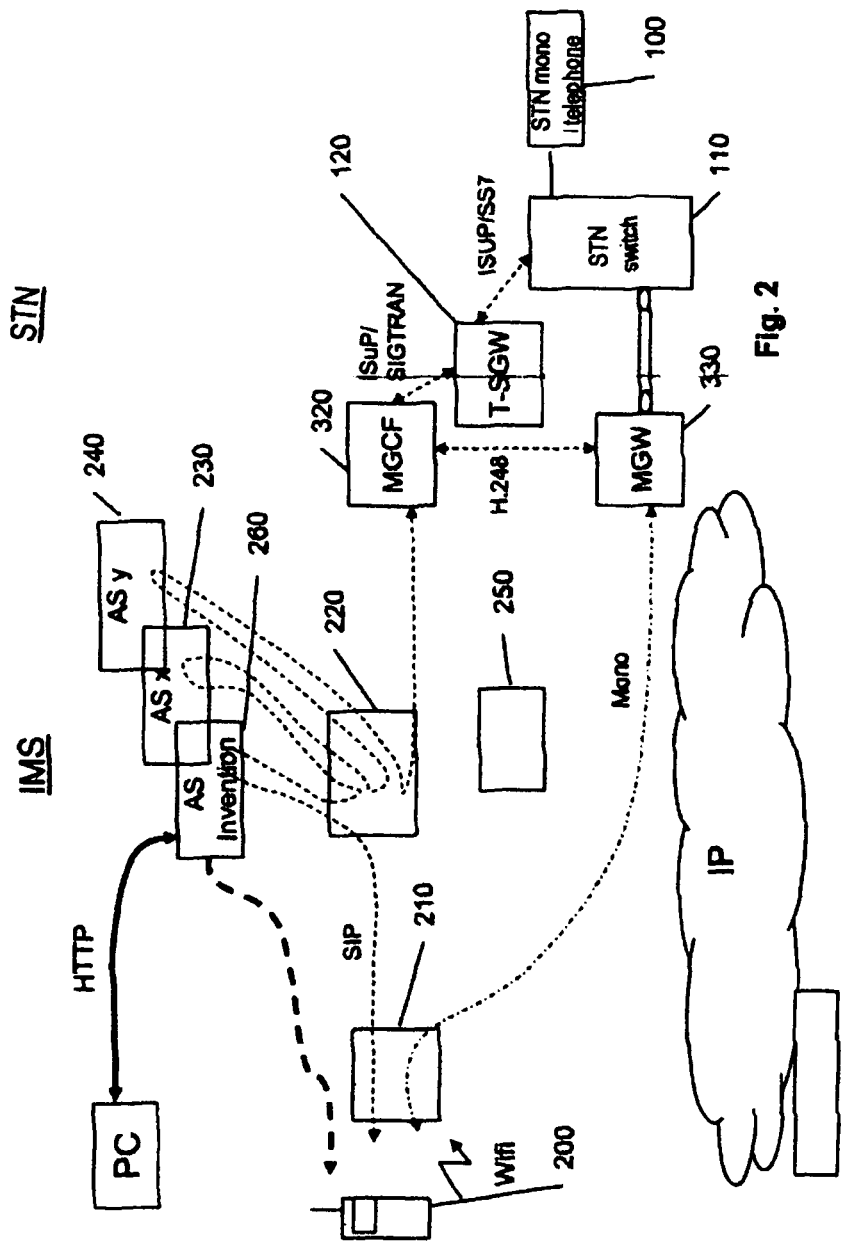

The description has to be read in conjunction with the appended drawings in which:

FIG. 1 is a block diagram showing the implementation of a known method of communicating between two terminals FIG. 2 is a block diagram showing the implementation of a communication method according to the invention.

The method according to the invention will be described below first of all within the framework of an exemplary communication between a first device and a second device that are realized by first and second particular terminals.

In other modes of implementation of the invention, the devices concerned will be able to be greater than two in number, and to include servers, for example information servers of Audiotel type or else voice messaging servers, etc.
  A known communication method comprises in particular:
    a step of hooking up a first device and a second device, in the example first and second particular terminals,
    a step of transferring a first multimedia stream from the first device to the second device.

The step of transferring an audio stream between the two terminals is naturally repeated throughout the communication.

FIG. 1 presents a known mode of implementation of a known method of communicating between two particular terminals connected to particular networks.

The first terminal 100 is connected to a first network that is not suitable for multimedia stream transfer and is suitable only for monophonic audio stream transfer. In a concrete example, the first network is of switched telephone network type (STN network). The first terminal is for its part a conventional fixed telephone 100 of which at least one base is linked by a wire to a telephone socket connected to a switch 110.

The STN network comprises in particular the switch 110 which is an input point of entry of the first terminal on the STN network, an input element 120 for managing hookup requests (T-GSM) having principally a gateway function for transporting the call signalling ISUP on different protocol layers and a function of transmitting a hookup request emitted by or for the first terminal or a hookup acceptance emitted for or by the first terminal.

In the example, for the transmission of hookup requests and hookup acceptances, the STN network uses in particular an ISUP (Integrated Service Digital Network Signalling User Part) signalling protocol. But any other known protocol suited to the first network can be used.

The second terminal 200 is connected to a second network; the second terminal and the second network have multimedia properties. In a concrete example, the second network is a telephone over IP network furnished with a conventional architecture of IMS (IP Multimedia Subsystem) type. The second terminal for its part is a portable telephone 200 linked by a WIFI link to access equipment 210, such as an ADSL (Asymmetric Digital Subscriber Line) modem and/or a router, and comprising a display screen for text, images and/or video and a stereophonic acoustic transducer such as a stereophonic headset with two earpieces.

The second network comprises in particular input equipment 220 (P-I-S-CSCF) whose principal functions are:
  to identify and to register the second terminal 200 on the second network,
  to transmit a hookup request emitted by or for the second terminal 200, or to transmit a hookup acceptance emitted by or for the second terminal.

The second network can also comprise one or more servers 230, 240 liable to provide the user of the second terminal with one or more application services such as for example a voice messaging service, advanced telephone services. The second network can also comprise a server of multimedia resources 250, whose function is for example to emit a multimedia stream containing a voice or video message, to perform a voice recognition on an audio stream, to mix multimedia streams received within the framework of a communication in conference mode, etc.

In the example, for the transmission of hookup requests and hookup acceptances, the second useful network in particular an SIP (Session Initiation Protocol) signalling protocol. But any other known protocol suited to the second network can be used.

The two networks are interconnected by way of a hookup gateway 320 and a data gateway 330.

The switch 110, the device 120, the gateway 320, the device 220 and the access equipment 210 together form a system for hooking up the first terminal and the second terminal, able to carry out the communication method hookup step.

The switch 110, the gateway 330 and the equipment 210 together form a system for transferring an audio stream from the first terminal to the second terminal (or the reverse).

In FIG. 1 is also represented the conventional pathway of the signals during a communication between the first terminal and the second terminal.

The hookup step is done in the following manner. The second terminal 200 emits a hookup request according to the SIP protocol, this request is transmitted by the device 220 to the gateway 320, which converts this request in the ISUP protocol and transmits it to the element 120 then to the switch 110 which finally transmits it to the first terminal. When the user of the first terminal accepts the hookup (by activating the telephone handset of the first terminal), an acceptance of the hookup is transmitted to the second terminal through a reverse path, by way of the switch 110, of the element 120, then of the gateway 320 then of the element 220, then of the equipment 210. Of course, if the communication is on the initiative of the user of the first terminal, the hookup request is emitted by the first terminal and transmitted to the second terminal, and the acceptance of the hookup follows the reverse path.

After reception by the second terminal of the acceptance of the hookup, a communication channel is established between the access equipment 210, the data gateway 330, the switch 110, and the transfer of audio signals between the users is done by audio stream transfer on the communication channel between the two terminals. The transfer step can be repeated several times in the course of the communication. In the STN network and in the IP telephone network, the audio streams are monophonic and travel on a single channel.

A communication method according to the invention is distinguished from an earlier method in that it also comprises the following steps:

- a determination step, in the course of which it is noted that the first device or a first communication network to which the first device is connected or a second network to which the second device is connected is suitable for the production or the transfer of a multimedia stream comprising N channels, and that the second device comprises means for processing a multimedia stream comprising P channels, and
- a step of trunking a second multimedia stream to the second device, carried out in parallel with the step of transferring the first multimedia stream.

In the chosen example, the determination step is carried out in parallel with the hookup step, the step of trunking a second multimedia stream is carried out in parallel with the step of transferring a first multimedia stream, only if N is less than P, the first multimedia stream is an audio stream comprising N=1 channel comprising a monophonic sound (for example a voice), and the second multimedia stream is an audio stream comprising P−N=1 channel also comprising a monophonic sound (for example a piece of music).

In the example chosen likewise, the first terminal and the first network are appropriate for the production or the transfer of a multimedia stream comprising N=1 channel (they are limited to the exchanging of monophonic audio streams) and the second terminal and the second network are appropriate for transmitting or utilizing multimedia streams with P=2 channels. The determination step therefore culminates in a positive conclusion and a step of trunking a second multimedia stream is carried out, in parallel with each step of transferring an audio stream (first multimedia stream).

FIG. 2 shows a mode of implementation of the method of the invention, by way of a dedicated application server 260 of the second network.

During the hookup step, the device 220 transmits a hookup request received from the second terminal 200 on the one hand to the first terminal (as in a known method) and on the other hand to the application server 260. The device 220 thereafter transmits the acceptance received from the first terminal 100 on the one hand to the second terminal 200 and on the other hand to a determination module of the application server 260.

In the mode of implementation of FIG. 2, the determination step is carried out by determination means of the application server 260. On the basis of the information (relating in particular to the number of ports on which the second terminal is liable to receive an audio signal, a video signal, a text signal, etc.) contained in the hookup request, the determination means determine the multimedia reception properties of the second terminal 200. In the same manner, on the basis of the information (relating in particular to the number of ports on which the first terminal is liable to emit an audio signal, a video signal, a text signal, etc.) contained in the hookup acceptance, the determination means determine the multimedia emission properties of the first terminal. The determination means finally determine whether the trunking step does or does not have to be carried out.

After the hookup step, and the determination step, a step of trunking a second multimedia stream to the second terminal is carried out by trunking means of the application server 260, in parallel with the step of transferring the first multimedia stream (audio stream) from the first terminal to the second terminal.

The content of the second multimedia stream produced and trunked by the trunking means to the second terminal 200 can depend on several parameters, provided by the determination means at the same time as a trunking step execution instruction.

The content of the multimedia stream depends first of all on the difference P−N of multimedia capabilities between on the one hand the second terminal and the second network and on the other hand the first terminal and the first network, as will be seen in the examples below.

In the practical example chosen and described above, the first terminal and the first network are limited to monophonic audio streams (N=1); the second terminal and the second network can on the other hand utilize multimedia streams comprising P=4 channels comprising a stereophonic audio signal (or two monophonic audio signals), an image or a video and a text. The first multimedia stream (audio stream relating to the telephonic communication) transmitted by the first terminal during the transfer step, can therefore be supplemented during the trunking step with a second multimedia stream containing another monophonic audio signal (a music signal or an information audio signal for example), a video signal or image signal (an advertisement or a film trailer for example), and/or a text signal (a text relating to information about the services offered by the server 260 or a cinema programme for example).

Of course, in another example of a second terminal having means for receiving a multimedia stream comprising only two monophonic audio signals (or a stereophonic signal) but not comprising any video signal and/or text signal, the second multimedia stream trunked by the server 260 will be limited to a monophonic audio stream (a music stream for example).

The content of the second multimedia stream can also depend on parameters imposed on the server 260 by the user or the proprietor of the second terminal 200, for example with the aid of a portable terminal 270 of PC (Personal Computer) type or with the aid of the terminal 200, and which are stored in a memory of the server 260. The user or the proprietor of the terminal 200 can thus request that the determination step and the trunking step are or are not carried out. The user can also decide to receive a particular multimedia stream (a particular piece of music or a particular advertisement for example) when he calls a predefined terminal 100 (or one of the terminals of a set of terminals that he defines) or when he receives a telephonic call from this predefined terminal 100 (or from a terminal of the set of terminals that he has defined).

The content of the second multimedia stream can further depend on parameters imposed by the proprietor of the server 260 and which are stored in a memory of the server 260. The proprietor of the server 260 can thus decide for example that the server 260 (and the associated method of the invention) is accessible in a restricted manner, for example on subscription.

The content of the multimedia stream can also depend on parameters imposed on the server 260 by the user or the proprietor of the first terminal 100, for example with the aid of a portable terminal of PC (Personal Computer) type or with the aid of the terminal 100, and which are stored in a memory of the server 260. The user or the proprietor of the terminal 100 can thus request that the determination step and the trunking step are or are not carried out. The user or the proprietor of the terminal 100 can also decide that a second particular multimedia stream (a particular piece of music or a particular advertisement for example) is dispatched to any terminal (optionally any terminal of a predefined list) which contacts the terminal 100 and which is endowed with multimedia properties.

In the above-described mode of implementation of the invention, it has been considered that:
the first terminal and the first network have only monophonic audio properties (N=1),
the second terminal and the second network have multimedia properties including the possibility of receiving and utilizing a stereophonic audio stream, an image stream or video stream and a text stream (P=4),
the determination means and the trunking means are located in an application server of the second network.

But many other modes of implementation are possible.

The first network and the second network can be two interconnected networks of Voice over IP type, or even a single network of Voice over IP type.

The first terminal can have multimedia properties equivalent to those of the second terminal (N=P). In this case, the invention is of benefit in particular in the case where the first network or the second network has inferior properties to the properties of the terminals.

The trunking means can be means of the server 250 of multimedia resources of the second network, or means of a server of multimedia resources of the first network.

More generally, the determination means can be means:
of an application server of the first network or of the second network (for example the server 250), or
of the access equipment 210 of the second device to the second network, or
of the input element 220 of the second network, or
of the second device.

The trunking means can be means:
of an application server of the first network or of the second network, or
of a server of multimedia resources of the first network or of the second network, or
of access equipment 210 of the second device to the second network, or
of an input element 220 of the second network, or
of the second device.

If the determination means and the trunking means are means of the connection equipment 210, or even of the device 200, then the invention can also be used also if the first network and the second network have inferior multimedia properties to the multimedia properties of the second device.

The determination means and/or the trunking means can be implemented in the form of software tasks.

The invention claimed is:

1. A method of communicating between at least two devices, comprising:
a step of hooking up a first device and at least one second device,
said first device being connected to a first network,
said at least one second device being connected to a second network,
said first device or said first network or said second network being suitable for production or transfer of a multimedia stream comprising N channels,
said at least one second device comprising means for processing a multimedia stream comprising P channels, where N is less than P; and
a step of transferring a first multimedia stream from the first device to the at least one second device,
wherein the method further comprises a determination step comprising:
determining, on the basis of information received during the step of hooking up, if a trunking of a second multimedia stream, comprising up to P−N complementary multimedia data, to the second device is possible or not, and
if a result of the determining step is that trunking is possible:
a step of trunking the second multimedia stream to the at least one second device, said step of trunking being carried out in parallel with the step of transferring the first multimedia stream, said second multimedia stream being provided by a server of multimedia resources for transmitting multimedia data.

2. The method as claimed in claim 1, wherein the first multimedia stream or the second multimedia stream comprises data relating to a sound signal and/or to a text and/or to a video signal and/or to an image signal.

3. The method as claimed in claim 1, wherein the first multimedia stream comprises N channels and the second multimedia stream comprises P minus N channels.

4. The method as claimed in claim 1 wherein a content of the second multimedia stream is dependent:
on parameters fixed by a user of the first device, and/or
on parameters fixed by a user of the second device,
on parameters fixed by a proprietor of determination means or trunking means used for the implementation of the method.

5. The method as claimed in claim 1 wherein the determination step is carried out in parallel with the hookup step.

6. The method as claimed in claims 1 wherein the determination step is carried out:
on request of a user of the first device or
on request of a user of the second device.

7. The method as claimed in 1 wherein the determination step is implemented by determination means:
of an application server of the first network or of the second network, or of access equipment of the second device for accessing the second network, or of an input element of the second network, or of the second device.

8. A communication system comprising:

a system for hooking up a first device and at least one second device,
  said first device being connected to a first network,
  said at least one second device being connected to a second network,
  said first device or said first network or said second network being suitable for production or transfer of a multimedia stream comprising N channels,
  said at least one second device comprising means for processing a multimedia stream comprising P channels, where N is less than P;

a system for transferring a first multimedia stream between the first device and the at least one second device;

means for determining properties of the first device and of the at least one second device for producing, transferring, receiving or processing a multimedia stream, and means for trunking a second multimedia stream, comprising up to P–N complementary multimedia data, provided by a server of multimedia resources, to the at least one second device, said trunking being carried out in parallel with the step of transferring the first multimedia stream, said means for trunking being active only if N is less than P.

9. The system as claimed in claim 8, wherein the hookup system and the transfer means comprise elements of a first network to which the first device is connected and/or elements of a second network to which the second device is connected and/or elements for interconnecting the first network and the second network.

10. The system as claimed in claim 8 wherein the determination means are means:

of an application server of the first network or of the second network or of access equipment of the second device for accessing the second network, or of the second terminal.

* * * * *